US009430638B2

(12) United States Patent
Huo

(10) Patent No.: US 9,430,638 B2
(45) Date of Patent: Aug. 30, 2016

(54) AUTHENTICATION METHOD, AUTHENTICATION APPARATUS AND AUTHENTICATION DEVICE

(71) Applicant: ZTE CORPORATION, Shenzhen, Guangdong Province (CN)

(72) Inventor: Xuanli Huo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/396,410

(22) PCT Filed: Jul. 25, 2013

(86) PCT No.: PCT/CN2013/080070
§ 371 (c)(1),
(2) Date: Oct. 23, 2014

(87) PCT Pub. No.: WO2013/185689
PCT Pub. Date: Dec. 19, 2013

(65) Prior Publication Data
US 2015/0220726 A1  Aug. 6, 2015

(30) Foreign Application Priority Data
Oct. 9, 2012  (CN) .......................... 2012 1 0379610

(51) Int. Cl.
*G06F 21/00*  (2013.01)
*G06F 21/44*  (2013.01)
(Continued)

(52) U.S. Cl.
CPC ............ *G06F 21/44* (2013.01); *G06F 21/6209* (2013.01); *H04W 12/06* (2013.01); *H04W 12/08* (2013.01); *G06F 2221/2129* (2013.01); *G06F 2221/2143* (2013.01); *H04L 63/10* (2013.01)

(58) Field of Classification Search
CPC ........... H04L 9/32; H04L 63/08; H04L 63/10; G06F 21/03; G06F 21/44; G06F 21/06
USPC ..................... 726/1–21, 26–33; 713/164–167, 713/182–186, 189–194
See application file for complete search history.

(56) References Cited

U.S. PATENT DOCUMENTS 7,996,914 B2 * 8/2011 Hirota ..................... G06F 21/10
713/172
9,154,957 B2 * 10/2015 Khan ..................... H04W 12/08
(Continued)

FOREIGN PATENT DOCUMENTS

CN  101090316 A  12/2007
CN  101256609 A  9/2008
(Continued)

*Primary Examiner* — Madhuri Herzog
(74) *Attorney, Agent, or Firm* — Ling Wu; Stephen Yang; Ling and Yang Intellectual Property

(57) ABSTRACT

The embodiment of the present document provides an authentication method, an authentication apparatus and an authentication device. The method includes: a first device determining an authentication preparation parameter; and according to the authentication preparation parameter, the first device transmitting a first authentication control message including a first device identifier stored in the first device to a second device with a second device identifier, controlling the second device to judge whether the first device identifier matches the second device identifier according to the first authentication control message, obtaining a judgment result, and when the judgment result is NO, performing a control operation to disable the second device from reading all or some user data from the first device.

8 Claims, 4 Drawing Sheets

(51) Int. Cl.
*H04W 12/06* (2009.01)
*H04W 12/08* (2009.01)
*G06F 21/62* (2013.01)
*H04L 29/06* (2006.01)

(56) References Cited

U.S. PATENT DOCUMENTS

2003/0097596 A1* 5/2003 Muratov ............... G06F 21/31
  726/26
2006/0020828 A1  1/2006 Aihara et al.
2007/0073937 A1* 3/2007 Feinberg ............... G06F 9/445
  710/62
2009/0006747 A1  1/2009 Otsuka
2009/0270126 A1  10/2009 Liu
2015/0235020 A1* 8/2015 Nagai .................... G06F 21/44
  726/28

FOREIGN PATENT DOCUMENTS

CN      101276432 A    10/2008
CN      101404577 A     4/2009

* cited by examiner

AUTHENTICATION METHOD, AUTHENTICATION APPARATUS AND AUTHENTICATION DEVICE

TECHNICAL FIELD

The embodiment of the present document relates to the information technology field, and in particular, to an authentication method, an authentication apparatus and an authentication device.

BACKGROUND OF THE RELATED ART

In practice, one device can be provided for other devices to use normally. In consideration of the information security, the user of that device may not hope that the device is used normally by the illegal device. For example, the user of a certain storage card may not hope that all or some user data in that storage card are read by the illegal mobile phone. However, there is no effective method to solve that kind of problem yet at present.

SUMMARY OF THE INVENTION

On that account, the embodiment of the present document provides an authentication method, an authentication apparatus and an authentication device, to restrain all or some user data in a certain device from being read by an illegal device.

In order to solve the above-mentioned technical problem, the embodiment of the present document provides the following scheme.

The embodiment of the present document provides an authentication method, comprising:

a first device determining an authentication preparation parameter; and according to the authentication preparation parameter, the first device transmitting a first authentication control message including a first device identifier stored in the first device to a second device with a second device identifier, controlling the second device to judge whether the first device identifier matches the second device identifier according to the first authentication control message, obtaining a judgment result, and performing a control operation when the judgment result is NO to disable the second device from reading all or some user data from the first device.

Preferably, the first device identifier is:

a device identifier read from a third device and stored when the first device is connected to the third device with the first device identifier in a situation that the first device identifier is not stored; or, a device identifier read from a fourth device and stored when a third device identifier stored by the first device matches a fifth device identifier input by a user of the fourth device with the first device identifier through an input unit of the fourth device.

Preferably, the method further comprises:

when the judgment result is NO, the first device controlling the second device to notify authentication failure-related information to a preset user.

Preferably, the step of controlling the second device to notify authentication failure-related information to a preset user comprises:

obtaining enciphered data after encrypting all or some user data;

controlling the second device to upload the enciphered data to a network storage system;

wherein, the network storage system can provide service for the preset user based on the enciphered data.

The embodiment of the present document provides an authentication method, comprising:

a second device receiving a first authentication control message including a first device identifier stored in a first device from the first device; and under control of the first device, the second device judging whether the first device identifier matches a second device identifier of the second device according to the first authentication control message, obtaining a first judgment result, and performing a control operation when the first judgment result is NO to disable the second device from reading all or some user data from the first device.

Preferably, the step of performing a control operation to disable the second device from reading all or some user data from the first device comprises:

obtaining a sixth device identifier input by a user through an input unit;

judging whether the first device identifier matches the sixth device identifier, and obtaining a second judgment result; and performing the control operation when the second judgment result is NO.

Preferably, the method further comprises:

under the control of the first device, when the first judgment result is NO, the second device notifying authentication failure-related information to a preset user.

Preferably, the step of notifying authentication failure-related information to a preset user comprises:

uploading enciphered data from the first device to a preset network storage system;

wherein, the enciphered data are obtained by the first device encrypting all or some user data.

The embodiment of the present document further provides an authentication apparatus, applied in a first device, comprising:

a determination module, configured to determine an authentication preparation parameter; and a transmission module, configured to: according to the authentication preparation parameter, transmit a first authentication control message including a first device identifier stored in the first device to a second device with a second device identifier, control the second device to judge whether the first device identifier matches the second device identifier according to the first authentication control message, obtain a first judgment result, and perform a control operation when the first judgment result is NO to disable the second device from reading all or some user data from the first device.

Preferably, the above-mentioned apparatus further comprises:

a first processing module, configured to: when the first judgment result is NO, control the second device to notify authentication failure-related information to a preset user.

The embodiment of the present document further provides an authentication apparatus, applied in a second device, comprising:

a receiving module, configured to: receive a first authentication control message including a first device identifier stored in a first device from a first device; and a second processing module, configured to: under control of the first device, judge whether the first device identifier matches a second device identifier of the second device according to the first authentication control message, obtain a first judgment result, and perform a control operation when the first judgment result is NO to disable the second device from reading all or some user data from the first device.

The embodiment of the present document further provides an authentication device, comprising the above-mentioned authentication apparatus.

The embodiment of the present document further provides another authentication method, comprising:

a storage card receiving an authentication request instruction generated and transmitted by a first terminal with a second terminal identification code under control of a fixed program preset in the storage card; and the storage card transmitting a first terminal identification code stored in the storage card to the first terminal according to the authentication request instruction, making the first terminal judging whether the first terminal identification code matches the second terminal identification code under the control of the fixed program, and obtaining a first judgment result, and the storage card deleting user data stored in the storage card when the first judgment result is NO.

Preferably, the first terminal identification code is:

the first terminal identification code, received from the second terminal and stored by the storage card, which is transmitted by the second terminal under the control of the fixed program when the storage card is connected to the second terminal with the first terminal identification code in a situation that the first terminal identification code is not stored; or, the first terminal identification code, received from a third terminal and stored by the storage card, which is transmitted by the third terminal under the control of the fixed program when a third terminal identification code stored by the storage card matches a fourth terminal identification code input by a user of the third terminal with the first terminal identification code through an input unit of the third terminal.

It can be seen from the above description, the embodiment of the present at least have the following beneficial effects:

by transmitting the first authentication control message to the second device, the second device is controlled to perform corresponding processing, thus disabling the second device from reading all or some user data from the first device when the second device identifier does not match the first device identifier stored by the first device;

by receiving the authentication request message transmitted by the first terminal under the control of the fixed program preset in the storage card, the stored first terminal identification code is sent to the first terminal according to the authentication request message, to make the first terminal perform corresponding processing under the control of the fixed program, thus disabling the first terminal from reading the user data from the storage card when the terminal identification code stored in the storage card does not match the terminal identification code of the first terminal.

PREFERRED EMBODIMENTS OF THE INVENTION

The embodiment of the present document is described in detail with reference to the accompanying drawings and the specific embodiment hereinafter. It should be illustrated that, in the case of not conflicting, the embodiments in the present application and features in these embodiments can be combined with each other arbitrarily.

Figure 1:
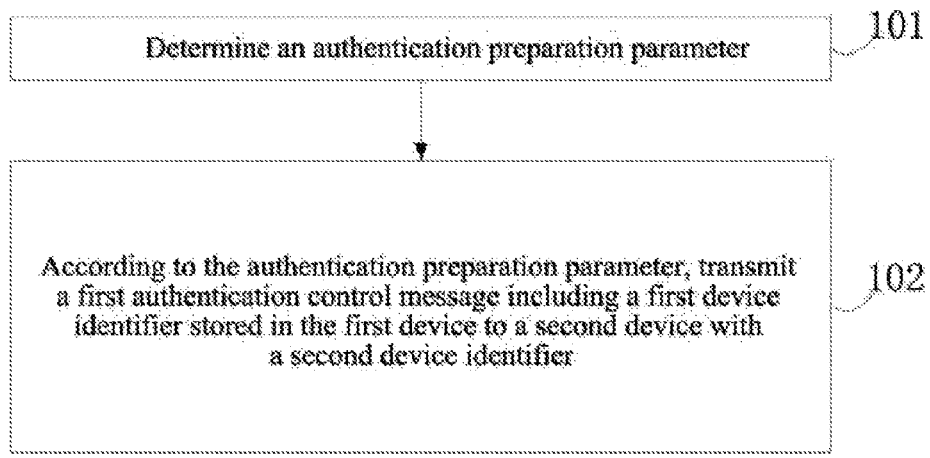
FIG. 1 is a flow chart of an authentication method provided by an embodiment of the present document.

FIG. 1 is a flow chart of an authentication method provided by an embodiment of the present document. Referring to FIG. 1, the authentication method includes the following steps.

In step 101, a first device determines an authentication preparation parameter.

In step 102, according to the authentication preparation parameter, the first device transmits a first authentication control message including a first device identifier stored in the first device to a second device with a second device identifier, controls the second device to judge whether the first device identifier matches the second device identifier according to the first authentication control message, obtains a first judgment result, and performs a control operation when the first judgment result is NO to disable the second device from reading all or some user data from the first device.

It is obvious that by transmitting the first authentication control message to the second device, the second device is controlled to perform corresponding processing, thus disabling the second device from reading all or some user data from the first device when the second device identifier does not match the first device identifier stored by the first device.

Wherein, the authentication preparation parameter can be a reading instruction for reading the user data in the first device, or, it can be the parameter generated when detecting that the first device is connected with the second device, or, it can be the authentication request instruction generated because of automatically running the fixed installation program preset in the first device after the second device detects that the second device is connected with the first device. Determining an authentication preparation parameter can be:

receiving the reading instruction from the second device; or, generating the authentication preparation parameter when detecting that the first device is connected with the second device; or, receiving the authentication request instruction from the second device.

The second device can run the fixed installation program preset in the first device before receiving the first authentication control message, and will judge whether the first device identifier matches the second device identifier under the trigger of the first authentication control message because of running the fixed installation program, obtains a first judgment result, and performs the control operation when the first judgment result is NO to disable the second device from reading all or some user data from the first device. Or, The first authentication control message can carry the execution code, thus making the second device execute the execution code, and judges whether the first device identifier matches the second device identifier because of executing the execution code, obtains the first judgment result, and performs the control operation when the first judgment result is NO to disable the second device from reading all or some user data from the first device.

It is judged whether two certain device identifiers (which here are the first device identifier and the second device identifier) match, for example:
whether these two device identifiers are the same; or,
whether these two device identifiers belong to the same device identifier set.

Said performing the control operation is, for example:
intercepting an instruction required for interacting with the first device by the second device to read all or some user data from the first device (for example, the instruction required to be sent to the first device); or,
the second device transmitting an instruction which makes the first device forbid the second device to read all or some user data to the first device, for example, an instruction for indicating the first device to delete all or some user data, an instruction for locking or formatting the first device, etc. Then the authentication method can also include: when receiving the instruction, forbidding the second device to read all or some user data according to the instruction.

The first device identifier can be:
a device identifier read from a third device and stored when the first device is connected to the third device with the first device identifier in a situation that the first device identifier is not stored; or,
a device identifier read from a fourth device and stored when a third device identifier stored by the first device matches a fifth device identifier input by a user of the fourth device with the first device identifier through an input unit of the fourth device.

Wherein, the third device and the second device can be same or different. The fourth device and the second device can be same or different. The fifth device identifier and the third device identifier can be same or different. When whether two certain device identifiers match is whether these two device identifiers are same, the fifth device identifier is the same as the third device identifier.

In order to make the user know the authentication failure-related information in time, the authentication method can also comprise:
when the first judgment result is NO, controlling the second device to notify authentication failure-related information to a preset user.

Specifically, for example, when the first judgment result is NO, the first device will receive an authentication failure instruction of the second device, and control the second device to notify authentication failure-related information to the preset user according to the authentication failure instruction.

Further, said controlling the second device to notify authentication failure-related information to a preset user can be: controlling the second device to explicitly notify, for example, controlling the second device to send a short message to the preset user to notify the authentication failure-related information to the preset user.

Alternatively, said controlling the second device to notify authentication failure-related information to a preset user can be: controlling the second device to implicitly notify, for example, said controlling the second device to notify authentication failure-related information to a preset user can be specifically:
obtaining enciphered data after encrypting all or some user data;
controlling the second device to upload the enciphered data to a network storage system;
wherein, the network storage system can provide service for the preset user based on the enciphered data.

Said providing the service for the preset user is, for example, providing the download service of the enciphered data for the preset user, and providing the inquiry and download service of the decoded data for the preset user after deciphering the enciphered data, etc.

Thus, the original user of the first device can both know that the authentication is failed, and there will not be great inconvenience for using all or some user data.

Wherein, the authentication failure-related information is, for example: the authentication failure instruction, the instruction of illegally using the device, etc. Alternatively, the authentication failure-related information can also include the first device identifier and/or the second device identifier; in this way, the preset user can know which device is illegally used, or know which device illegally uses its own device.

Figure 2:
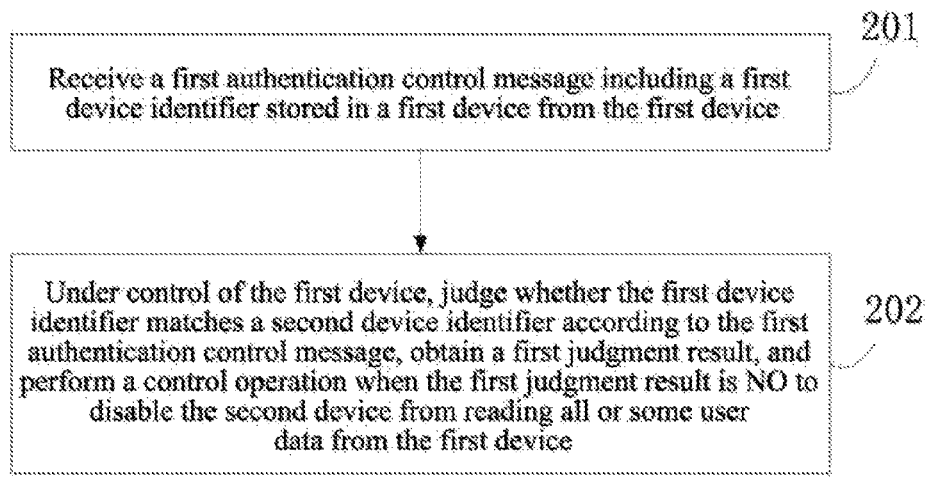
FIG. 2 is a flow chart of another authentication method provided by an embodiment of the present document.

FIG. 2 is a flow chart of another authentication method provided by an embodiment of the present document. Referring to FIG. 2, the authentication method includes the following steps.

In step 201, a second device receives a first authentication control message including a first device identifier stored in a first device from the first device.

In step 202, under control of the first device, the second device judges whether the first device identifier matches a second device identifier of the second device according to the first authentication control message, obtains a first judgment result, and performs a control operation when the first judgment result is NO to disable the second device from reading all or some user data from the first device.

It is obvious that the second device performs corresponding processing under the control of the first device, thus disabling the second device from reading all or some user data from the first device when the second device identifier does not match the first device identifier stored in the first device.

It is considered that, if the first device belongs to one user, then when the user uses the first device through a device which will judge that the first judgment result is NO, the device is unable to read all or some user data from the first device, thus causing inconvenience for using by that user. In view of this,
said performing the control operation to disable the second device from reading all or some user data from the first device can be specifically:
obtaining a sixth device identifier input by a user through an input unit;
judging whether the first device identifier matches the sixth device identifier, and obtaining a second judgment result; and
performing the control operation when the second judgment result is NO.

Considering that the user may input wrongly, it can allow the user to have a chance of making mistakes for one or two or more times, thus,
Said performing the control operation when the second judgment result is NO may be:
when the second judgment result is NO, judging whether the number of inputs of the sixth device identifier reaches a preset number, and obtaining the third judgment result;
when the third judgment result is YES, then performing the control operation;
when the third judgment result is NO, then returning to the step of obtaining the sixth device identifier input by the user through the input unit.

Wherein, the sixth device identifiers input every time can be all the same, and can be not all the same.

In addition, in order to make the user know the authentication failure-related information in time, the authentication method can also comprise:

under the control of the first device, when the first judgment result is NO, the second device notifying authentication failure-related information to a preset user.

Wherein, the authentication failure-related information is, for example: the authentication failure instruction, the instruction of illegally using the device, etc.

Wherein, said notifying the authentication failure-related information to the preset user can be: sending a short message including the authentication failure-related information to the preset user; or for the purpose of that there will not be inconvenient for the original user of the first device to use all or some user data, said notifying the authentication failure-related information to the preset user can be:

uploading enciphered data from the first device to a preset network storage system;

wherein, the enciphered data are obtained by the first device encrypting all or some user data.

The network storage system is, for example, a server.

The embodiment of the present document further provides an authentication method, applied in a storage card, including the following steps.

In step 110, a storage card receives an authentication request instruction generated and transmitted by a first terminal with a second terminal identification code under control of a fixed program preset in the storage card.

In step 111, the storage card transmits a first terminal identification code stored in the storage card to the first terminal according to the authentication request instruction to make the first terminal judge whether the first terminal identification code matches the second terminal identification code under the control of the fixed program, and obtains a first judgment result, and the storage card deletes user data stored in the storage card when the first judgment result is NO.

It is obvious that, by receiving the authentication request message transmitted by the first terminal under the control of the fixed program preset in the storage card, the stored first terminal identification code is sent to the first terminal according to the authentication request message to make the first terminal perform corresponding processing under the control of the fixed program, thus disabling the first terminal from reading the user data from the storage card when the terminal identification code stored in the storage card does not match the terminal identification code of the first terminal.

Wherein, the first terminal identification code can be:

the first terminal identification code, received from the second terminal and stored by the storage card, which is transmitted by the second terminal under the control of the fixed program when the storage card is connected to the second terminal with the first terminal identification code in a situation that the first terminal identification code is not stored; or, the first terminal identification code, received from a third terminal and stored by the storage card, which is transmitted by the third terminal under the control of the fixed program when a third terminal identification code stored by the storage card matches a fourth terminal identification code input by a user of the third terminal with the first terminal identification code through an input unit of the third terminal.

In order to explain the three above-mentioned authentication methods provided by the embodiment of the present document clearly, the above-mentioned authentication method is illustrated by taking the first device as the storage card (for example, a T card) and the second device as the terminal (for example, a mobile phone) for example hereinafter.

Figure 3:
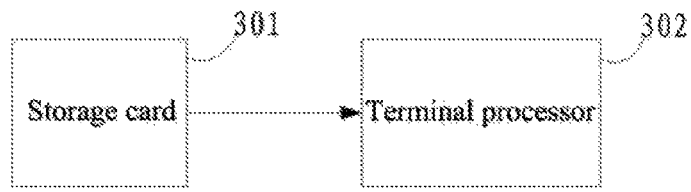
FIG. 3 is a system structure diagram of an example provided by an embodiment of the present document.

FIG. 3 is a system structure diagram provided by an embodiment of the present document. Referring to FIG. 3, the system includes a storage card storing a fixed program and a terminal processor. Wherein, the fixed program is an automatic program. The fixed program is unable to be deleted or formatted by the user, and is a protected part stored in the storage card. During a process that the terminal runs the fixed program, the terminal processor is used for judging whether the terminal identification code stored in the storage card matches the terminal identification code of the terminal.

Figure 4:
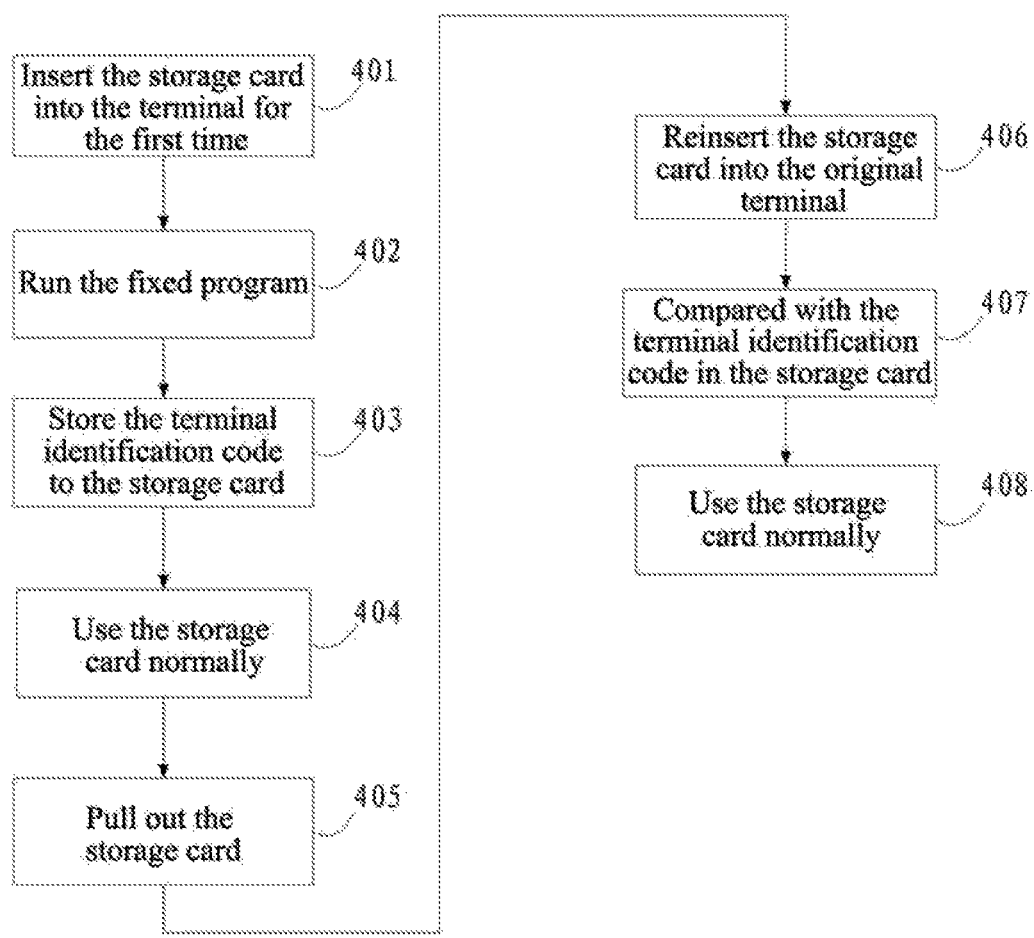
FIG. 4 is a flow chart of binding a storage identification to a terminal identification code in an example provided by an embodiment of the present document.

FIG. 4 is a flow chart of binding a storage identification to a terminal identification code in an example provided by an embodiment of the present document. Referring to FIG. 4, the steps of binding a storage identification to a terminal identification code when the storage card is inserted in a certain terminal for the first time and inserted in that terminal again later are as follows.

In step 401, the storage card is inserted in the terminal for the first time.

In step 402, after the terminal starts up, it will run the fixed program preset in the storage card automatically when detecting that there is a storage card inserted, and step 403 and step 404 are executed according to the fixed program.

In step 403, the terminal stores the terminal identification code to the storage card.

Wherein, the terminal identification code, for example, is MEID when the terminal is a CDMA mobile phone, and is IMEI when the terminal is a WCDMA or GSM mobile phone, etc.

In step 404, after the storage card stores the terminal identification code, the terminal uses the storage card normally.

Wherein, the terminal uses the storage card normally, for example, the terminal reads the user data from the storage card.

In step 405, the user pulls out the storage card.

In step 406, the user reinserts the storage card into the original terminal.

In step 407, it is compared with the terminal identification code in the storage card.

Specifically, after the terminal starts up, it runs the fixed program preset in the storage card automatically, and executes the following operation according to the fixed program: the terminal processor sends out the instruction to compare the terminal identification code of the terminal and the terminal identification code stored in the storage card, so as to judge whether the terminal identification code stored in the storage card matches the terminal identification code of the terminal; if YES, step 408 is executed.

In step 408, the terminal uses the storage card normally.

Figure 5:
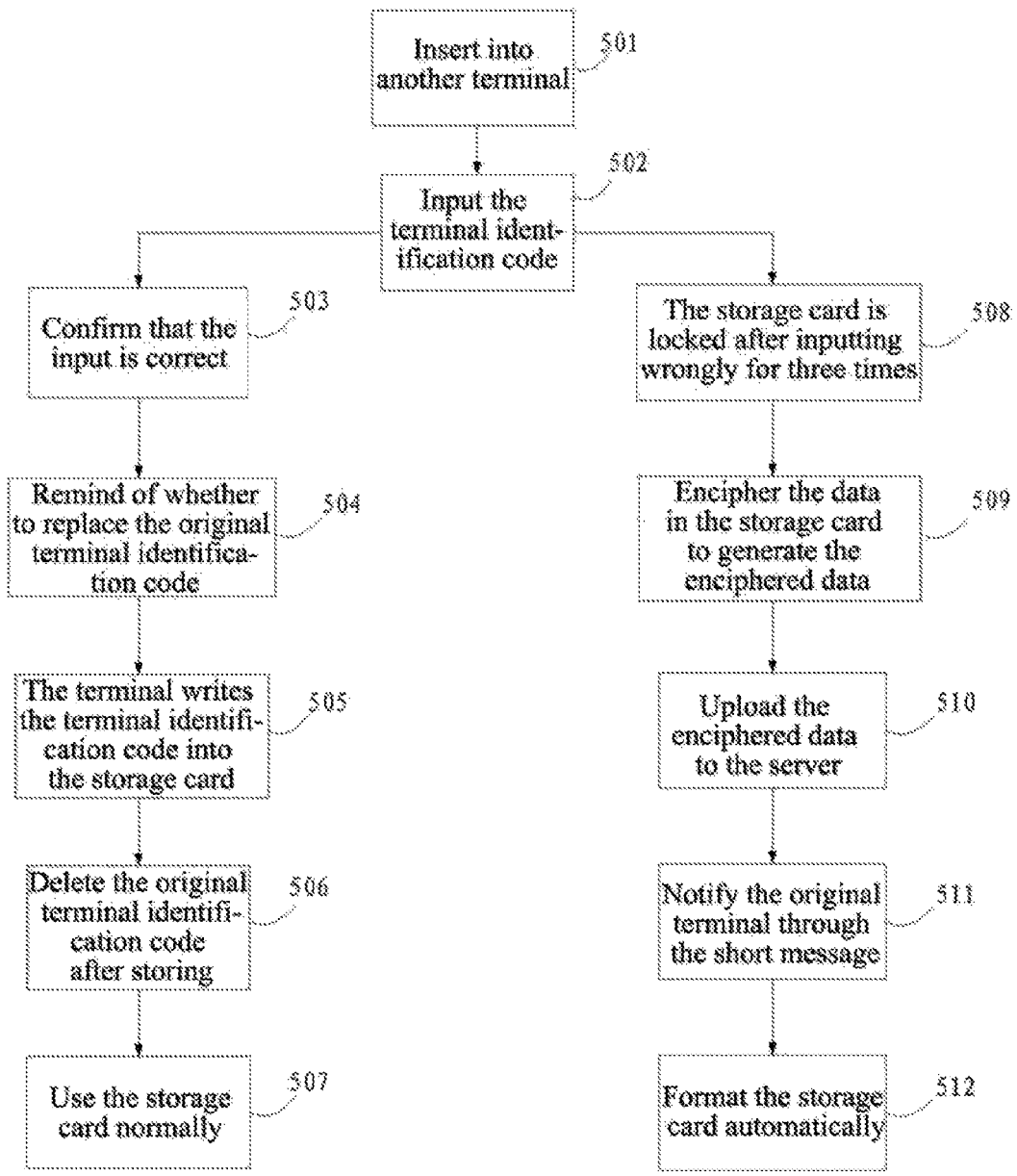
FIG. 5 is a flow chart in a situation that a storage card is inserted in another terminal in an example provided by an embodiment of the present document.

FIG. 5 is a flow chart in a situation that a storage card is inserted in another terminal in an example provided by an embodiment of the present document. Referring to FIG. 5, now the storage card stores a terminal identification code and the stored terminal identification code is a terminal identification code of a original terminal, then there are the following steps in a situation that the storage card is inserted in another certain terminal.

In step 501, the storage card is inserted into another terminal.

In step 502, the terminal identification code is input.

Specifically, after the other terminal starts up, it runs the fixed program preset in the storage card automatically, and executes the following operation according to the fixed program: the terminal processor sends out the instruction to compare the terminal identification code of the other terminal and the terminal identification code stored in the storage card, so as to judge whether the terminal identification code stored in the storage card matches the terminal identification code of other terminal; if NO, then the other terminal sends out an instruction to pop up a dialog box to remind of inputting the terminal identification code, and judges whether the input terminal identification code matches the terminal identification code stored in the storage card when receiving the terminal identification code input by the user after seeing the dialog box; if YES, then step 503 is executed; if NO, step 508 is executed.

In step 503, the other terminal judges that the input terminal identification code matches the terminal identification code stored in the storage card, that is, the other terminal confirms that the input is correct, then step 504 is executed according to the fixed program stored in the storage card.

In step 504, the other terminal sends out an instruction to pop up the dialog box to remind of whether to replace the terminal identification code stored in the storage card; if YES, steps 505-507 are executed according to the fixed program stored in the storage card; and if NO, step 507 is executed according to the fixed program stored in the storage card.

In step 505, the other terminal writes the terminal identification code of the other terminal into the storage card according to the replacement instruction of the user.

In step 506, the other terminal deletes the original terminal identification code stored in the storage card after the written terminal identification code is stored by the storage card.

In step 507, the other terminal can use the storage card normally.

In step 508, the other terminal judges that the input terminal identification code does not match the terminal identification code stored in the storage card, that is, the other terminal confirms that the input is wrong, then the step a is executed:

it is judged whether the number of inputs of the current terminal identification code reaches a preset number (for example, 3 times); if YES, then a locking instruction is sent to the storage card to lock the storage card, and steps 509-512 are executed according to the fixed program in the storage card; if NO, then it sends out an instruction to pop up the dialog box to remind of inputting the terminal identification code again, to judge whether the terminal identification code input again matches the terminal identification code stored in the storage card; if YES, then steps 504-507 are executed according to the fixed program in the storage card; and if NO, then it is to return to the step a.

In step 509, the other terminal sends an encryption instruction to the storage card to make the data in the storage card be enciphered by the storage card to generate the enciphered data.

In step 510, the other terminal uploads the enciphered data to the server.

Wherein, the server, for example, is a cloud server.

In step 511, the other terminal sends the short messages automatically to notify the original terminal.

In step 512, the other terminal sends a formatting instruction to the storage card to format the storage card automatically.

Figure 6:
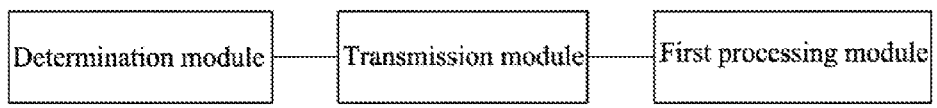
FIG. 6 is a structure diagram of an authentication apparatus provided by an embodiment of the present document.

The embodiment of the present document further provides an authentication apparatus, applied in a first device. As shown in FIG. 6, the authentication apparatus includes:

a determination module, configured to determine an authentication preparation parameter; and a transmission module, configured to: according to the authentication preparation parameter, transmit a first authentication control message including a first device identifier stored in the first device to a second device with a second device identifier, control the second device to judge whether the first device identifier matches the second device identifier according to the first authentication control message, obtain a first judgment result, and perform a control operation when the first judgment result is NO to disable the second device from reading all or some user data from the first device.

It is obvious that, by transmitting the first authentication control message to the second device, the second device is controlled to perform corresponding processing, thus disabling the second device from reading all or some user data from the first device when the second device identifier does not match the first device identifier stored by the first device.

The authentication apparatus can further comprise:

a first processing module, configured to: when the first judgment result is NO, control the second device to notify authentication failure-related information to a preset user.

Figure 7:
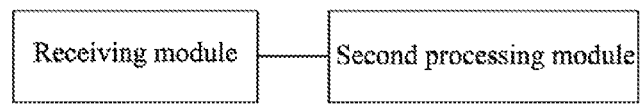
FIG. 7 is a structure diagram of another authentication apparatus provided by an embodiment of the present document.

The embodiment of the present document further provides an authentication apparatus, applied in a second device. The second has a second device identifier. As shown in FIG. 7, the authentication apparatus comprises:

a receiving module, configured to: receive a first authentication control message including a first device identifier stored in a first device from the first device; and a second processing module, configured to: under control of the first device, judge whether the first device identifier matches a second device identifier of the second device according to the first authentication control message, obtain a first judgment result, and perform a control operation when the first judgment result is NO to disable the second device from reading all or some user data from the first device.

It is obvious that the second device performs the corresponding process under the control of the first device, thus disabling the second device from reading all or some user data from the first device when the second device identifier does not match the first device identifier stored by the first device.

The embodiment of the present document further provides an authentication device, including the above-mentioned authentication apparatus.

It can be understood by those skilled in the art that all or part of steps in the above-mentioned method can be fulfilled by programs instructing the-related hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of a combination of hardware and software.

The above description is for the preferable embodiments of the present document. It should be pointed out that, for those skilled in the art, a plurality of improvements and modifications also can be made without departing from principles of the present document, and all the improvements and modifications should be embodied in the scope of the present document.

INDUSTRIAL APPLICABILITY

With the embodiment of the present document, all or some user data in a certain device can be restrained from being read by an illegal device.

What I claim is:

1. A non-transitory computer readable storage card, storing a fixed program unable to be deleted or formatted, wherein when the storage card is inserted into a terminal with a second terminal identification code, the program is automatically run after the terminal starts up to cause a hardware processor of the terminal to execute the following steps:

comparing a first terminal identification code stored in the storage card with the second terminal identification code of the terminal to judge whether the first terminal identification code matches the second terminal identification code and obtaining a first judgment result, when the first judgment result is NO, popping up a dialog box to remind a user of inputting another terminal identification code, and when receiving a terminal identification code input by a user, judging whether the terminal identification code input by the user matches the first terminal identification code stored in the storage card;

when the terminal identification code input by the user matches the first terminal identification code stored in the storage card, popping up another dialog box to remind the user of whether to replace the first terminal identification code stored in the storage card; and when a replacement instruction of the user is received, writing the second terminal identification code of the terminal into the storage card according to the replacement instruction of the user, and deleting the first terminal identification code stored in the storage card after the second terminal identification code is stored by the storage card;

when the terminal identification code input by the user does not match the first terminal identification code stored in the storage card, deleting user data stored in the storage card.

2. The storage card according to claim 1, the program further causes the processor of the terminal to execute the following step:

when the first judgment result is NO, notifying authentication failure-related information to a preset user.

3. A terminal, comprising a hardware processor, wherein when the terminal is inserted with a storage card storing a fixed program, the program is automatically run after the terminal starts up to cause the hardware processor of the terminal to execute the following steps:

comparing a first terminal identification code stored in the storage card with a second terminal identification code of the terminal to judge whether the first terminal identification code matches the second terminal identification code and obtaining a first judgment result;

when the first judgment result is NO, popping up a dialog box to remind a user of inputting another terminal identification code, and when receiving a terminal identification code input by a user, judging whether the terminal identification code input by the user matches the first terminal identification code stored in the storage card;

when the terminal identification code input by the user matches the first terminal identification code stored in the storage card, popping up another dialog box to remind the user of whether to replace the first terminal identification code stored in the storage card; and when a replacement instruction of the user is received, writing the second terminal identification code of the terminal into the storage card according to the replacement instruction of the user, and deleting the first terminal identification code stored in the storage card after the second terminal identification code is stored by the storage card;

when the terminal identification code input by the user does not match the first terminal identification code stored in the storage card, deleting user data stored in the storage card.

4. A terminal, comprising the storage card according to claim 1.

5. An authentication method, comprising:

after a terminal with a second terminal identification code and where a storage card is inserted starts up, a fixed program preset in the storage card is automatically run to make the terminal perform the following steps:

comparing a first terminal identification code stored in the storage card with the second terminal identification code of the terminal and to judge whether the first terminal identification code matches the second terminal identification code and obtaining a first judgment result;

when the first judgment result is NO, popping up a dialog box to remind a user of inputting another terminal identification code, and when receiving a terminal identification code input by a user, judging whether the terminal identification code input by the user matches the first terminal identification code stored in the storage card;

when the terminal identification code input by the user matches the first terminal identification code stored in the storage card, popping up another dialog box to remind the user of whether to replace the first terminal identification code stored in the storage card; and when a replacement instruction of the user is received, writing the second terminal identification code of the terminal into the storage card according to the replacement instruction of the user, and deleting the first terminal identification code stored in the storage card after the second terminal identification code is stored by the storage card;

when the terminal identification code input by the user does not match the first terminal identification code stored in the storage card, deleting user data stored in the storage card.

6. The method according to claim 5, wherein, the first terminal identification code is:

the first terminal identification code, received from a second terminal and stored by the storage card, which is transmitted by the second terminal under the control of the fixed program when the storage card is connected to the second terminal with the first terminal identification code in a situation that the first terminal identification code is not stored.

7. A terminal, comprising the storage card according to claim 2.

8. The method according to claim 5, wherein, the fixed program preset in the storage card further makes the terminal perform the following steps: before the step of deleting user data stored in the storage card:

judging whether a number of inputs of terminal identification codes reaches a preset number; if YES, then a locking instruction is sent to the storage card to lock the storage card and then deleting the user data;

if no, sending out an instruction to pop up the dialog box to remind of inputting the terminal identification code again.

* * * * *